N. F. BRINK.
PROJECTING APPARATUS.
APPLICATION FILED JAN. 10, 1914.
1,127,725.
Patented Feb. 9, 1915.
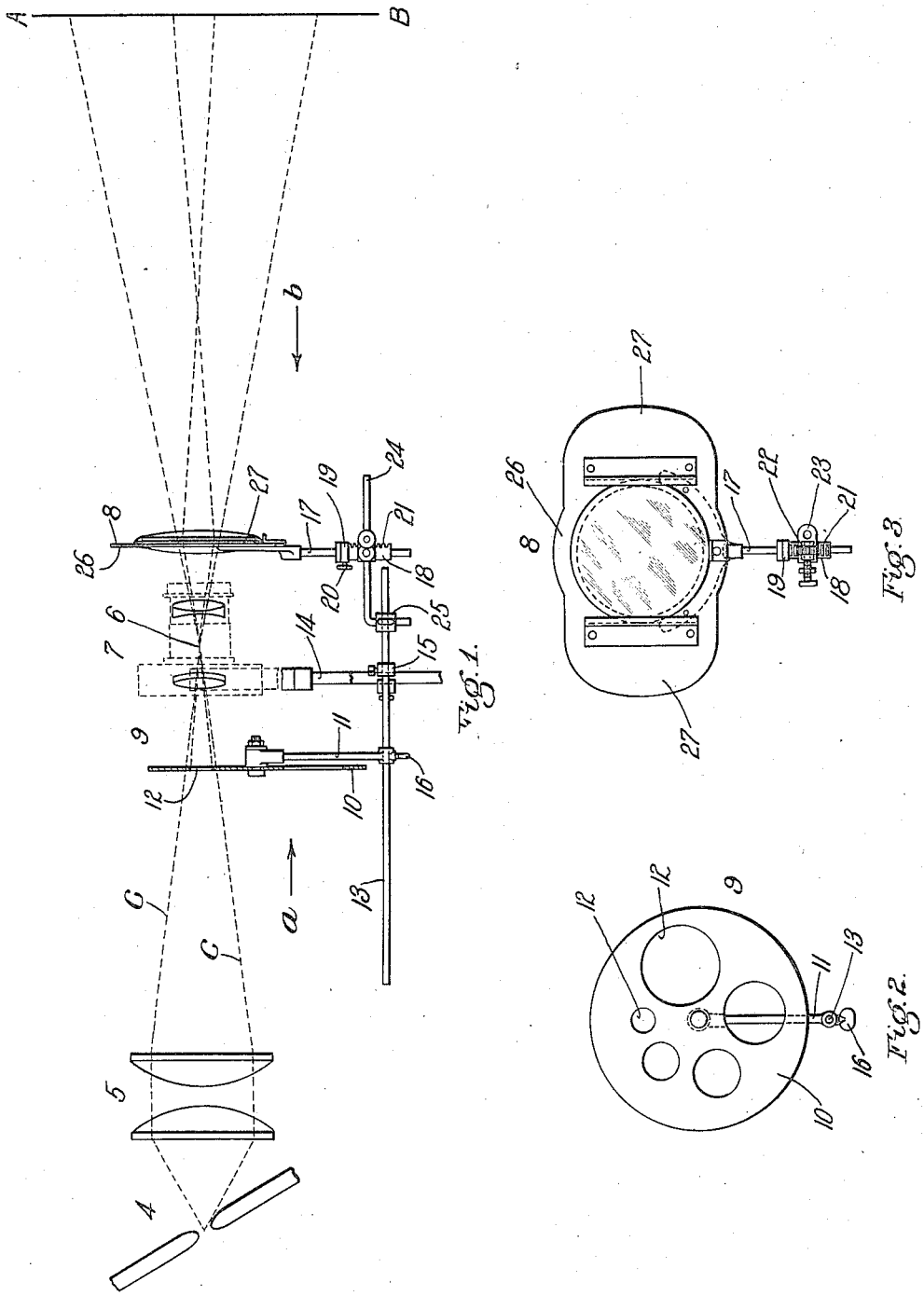
Witnesses:
Leonard A. Powell
Franklin E. Low
Inventor:
Norbert F. Brink

UNITED STATES PATENT OFFICE.

NORBERT F. BRINK, OF BOSTON, MASSACHUSETTS.

PROJECTING APPARATUS.

1,127,725. Specification of Letters Patent. Patented Feb. 9, 1915.

Application filed January 10, 1914. Serial No. 811,464.

*To all whom it may concern:*

Be it known that I, NORBERT F. BRINK, a subject of the Czar of Russia, residing at Boston, in the county of Suffolk and State of Massachusetts, have invented new and useful Improvements in Projecting Apparatus, of which the following is a specification.

This invention relates to improvements in projecting apparatus and has for its object to provide attachments for said projecting apparatus for the purpose of producing spots of light of predetermined sizes upon the screen.

The invention further consists in providing means for supporting said attachments in relation to the primary condensing lens of the apparatus which permits said attachments to be universally adjusted relatively to said lens.

The invention consists in the combination and arrangement of parts set forth in the following specification and particularly pointed out in the claims.

Referring to the drawings: Figure 1 is a diagrammatic view of a projecting apparatus with a diaphragm and a supplementary condenser embodying my invention shown in connection therewith. Fig. 2 is a detail side elevation of the diaphragm as viewed in the direction of the arrow "*a*", Fig. 1. Fig. 3 is a detail front elevation of the supplementary condenser, illustrated in Fig. 1, as viewed in the direction of the arrow "*b*".

Like numerals refer to like parts throughout the several views of the drawings.

In the drawings, 4 is a pair of carbons representing the light creating instrumentalities of the projecting apparatus. 5 are the primary condensing lenses through which the rays of light from the light creating instrumentalities are projected and condensed, as indicated by the dotted lines "*c*" Fig. 1. The rays of light "*c*" are focused at a point 6 at which point said rays cross and from whence they diverge and are projected upon the screen, which for the purpose of illustration is indicated by the line "A—B."

Arranged adjacent the crossing point 6 of the rays "*c*" is the objective 7 by means of which the object thrown on the screen may be made sharp and clear. It is often desirable in connection with an apparatus of this nature to produce what is known as a spot light, that is to say, to throw a small spot of light on some particular point on the screen or stage and to vary the size of said spot of light. This has often been accomplished by inserting lenses, such as the lens 8 and hereafter designated as a supplementary condenser, between the crossing point 6 of the rays "*c—c*" and the screen, to condense the rays of light passing or projected thereon, and by moving said lenses transversely of said rays of light the spot on the screen may be shifted from place to place. When such a device is employed to vary the size of the spot upon said screen, lenses of different foci are employed each being placed at its focal length from the objective 7. This method however is objectionable for the reason that where projecting apparatus are employed, the law requires that said apparatus must be incased or housed in an asbestos or fireproof inclosure, which is provided with an opening in the front wall to permit the rays of light from the apparatus to be projected upon the screen. This opening must necessarily be small and on account of its being small must be very close to the front of the apparatus, with the result that the space between said wall and the objective, or the crossing point 6, of the rays "*c*" will not permit of any great variation in the focal lengths of condensers placed between said wall and said objective. Furthermore where condensers are used alone, as specified, the outline of the spot is not sharply defined and this spot is usually surounded by a ring of yellow light, but the center of said spot of light is bright and clear.

To overcome the difficulties enumerated, a diaphragm 9 is interposed between the supplementary condenser 8 and the primary condensers 5 and preferably at the focal distance from said supplementary condenser, this length bringing said diaphragm upon the opposite side of the objective 7 from said supplementary condenser or intermediate said objective and the condensers 5.

The diaphragm 9, which may be constructed in any manner permitting the variation of the size of opening therethrough, is for convenience illustrated in the drawings as consisting of a disk 10 rotatably mounted on an arm 11 at one side of the rays of light "*c*", said disk having a plurality of apertures 12 extending therethrough and adapted to be moved into a position concentric with the axis of said rays of light and when it is desired to vary the size of the spot of light on the screen "A—B", the size of the hole in the aperture 12 is changed by rotating said disk to present a hole of the proper size to said rays of light.

The nearer the diaphragm 9 is placed to the crossing point 6 or the objective 7, the more intense will be the spot of light on the screen for the reason that more of the rays of light will be permitted to pass through the hole in said diaphragm, that is, providing the supplementary condenser 8 is always maintained at its focal length from said diaphragm.

To vary the intensity of the spot of light, the diaphragm 9 and the supplementary condenser 8 are simultaneously moved longitudinally of the axis of said rays of light without varying the distance therebetween, thus projecting on the screen a spot of light of the same diameter, but of varying intensity. To permit this adjustment said diaphragm and said condenser are mounted upon a rod 13 arranged substantially parallel to the axis of the rays of light and upon a support 14 for the objective 7, in a clamp 15. The arm 11, which supports the disk 10, is mounted directly on said rod 13 and clamped thereto by means of a thumb screw 16 permitting said arm to be moved longitudinally on said rod and to be rocked thereon to properly position said disk relatively to the rays of light, or in other words permitting a universal movement of said diaphragm relatively to said rays of light. The supplementary condenser 8 is likewise universally mounted relatively to said rays of light.

A greater range of movement however is necessary with said condenser than is necessary for said diaphragm as the condenser is moved to shift the spot of light on the screen, whereas the diaphragm is moved only when it is desired to properly position the same in order that the several holes therein may, upon the rotation of the disk 10, be brought into alinement with said rays of light, but after once being set said arm 11 need seldom be moved on said rod as the largest hole in said disk is larger than the area covered by the rays of light at the point where said diaphragm intersects said rays, thus permitting the entire volume thereof to pass through to the objective 7.

To facilitate the adjustment of the supplementary condenser 8, said condenser is provided with a rod 17 which is both slidably and rotatably arranged in a sleeve 18 and supported at a predetermined height in said sleeve by a collar 19 secured to said rod by a screw 20. Teeth 21 are provided on the sleeve 18 adapted to be engaged by a pinion 22 rotatably mounted in a collar 23 in turn adjustably secured to an arm 24, said arm being pivotally connected to the rod 13 by a collar 25.

The condenser 8 is surrounded by a frame 26 consisting of wings 27 projecting laterally at each side of said condenser, said wings being for the purpose of preventing rays of light from passing outside of said condenser when the same is moved from side to side relatively to the screen to shift the spot of light thereon.

The general operation of the device hereinbefore specifically described is as follows: The supplementary condenser 8 and the diaphragm 9 are placed at the correct distance apart upon opposite sides of the objective 7 and the hole of the proper size in the disk 10 of said diaphragm selected and rotated to aline with the rays of light projected from the condenser 5. When it is desired to vary the intensity of the spot of light, the rod 13 is moved longitudinally of said rays through the clamp 15 and the spot projected by said apparatus is shifted to the desired location on said screen by rocking the arm 24 upon its pivot or by raising or lowering the sleeve 18 by means of the pinion 22. When it is desired to project a picture on the screen the supplementary condenser 8 is swung out of the path of the rays of light and the disk 10 rotated until the largest opening therein is moved into alinement with said rays, permitting all of said rays to pass therethrough.

Having thus described my invention what I claim and desire by Letters Patent to secure is:

1. A projecting apparatus having, in combination, a set of primary condensing lenses, a supplementary condenser arranged at a distance from said primary lenses, a diaphragm disposed between said primary condensing lenses and said supplementary condenser and at the focal distance from said supplementary condenser, and means adapted to be operated to vary the size of the opening in said diaphragm.

2. A projecting apparatus having, in combination, a set of primary condensing lenses, a supplementary condenser arranged at a distance from said primary lenses, a diaphragm disposed between said primary condensing lenses and said supplementary condensing lenses and at the focal distance from said supplementary condenser, means adapted to be operated to vary the size of the opening in said diaphragm, and means adapted to simultaneously move said diaphragm and said supplementary condenser toward or away from said primary condensing lenses.

3. A projecting apparatus having, in combination, a set of primary condensing lenses, a supplementary condenser arranged at a distance from said primary condensing lenses, a diaphragm disposed between said primary condensing lenses and said supplementary condensing lenses and substantially at the focal distance from said supplementary condenser, means adapted to be operated to vary the size of the opening in said diaphragm, and a support for said supplementary condenser adapted to permit a universal transverse movement thereof relatively to said diaphragm.

4. A projecting apparatus having, in combination, a set of primary condensing lenses, an objective lens, light creating instrumentalities adapted to project rays of light through said several sets of lenses, a diaphragm interposed between said primary condensing lenses and said objective lens adapted to cut out a predetermined number of the rays of light directed toward said objective lens, and a supplementary condenser mounted upon the opposite side of said objective lens from that of said diaphragm and substantially at its focal distance from said diaphragm adapted to condense the rays of light projected from said objective lens, and means to move said supplementary condenser universally transversally of said rays of light to shift the spot of light projected by said apparatus.

5. A projecting apparatus having, in combination, a set of primary condensing lenses, an objective lens, light creating instrumentalities adapted to project rays of light through said several sets of lenses, a support for said objective lens, a rod mounted on said support adapted to be moved substantially longitudinally of the axes of said lenses, a diaphragm mounted on said rod intermediate said primary condensing lenses and said objective lens, a supplementary condenser mounted on said rod upon the opposite side of said objective lens from that of said diaphragm, said supplementary condenser adapted to be universally moved transversely of the rays of light projected through said lenses, whereby the spot of light projected thereby may be shifted.

In testimony whereof I have hereunto set my hand in presence of two subscribing witnesses.

NORBERT F. BRINK.

Witnesses:
 CHARLES S. GOODING,
 SYDNEY E. TAFT.